(12) United States Patent
Zhu et al.

(10) Patent No.: US 11,457,746 B2
(45) Date of Patent: Oct. 4, 2022

(54) TRAVEL PILLOW

(71) Applicants: Brian Y. Zhu, Poughkeepsie, NY (US); Huilong Zhu, Poughkeepsie, NY (US)

(72) Inventors: Brian Y. Zhu, Poughkeepsie, NY (US); Huilong Zhu, Poughkeepsie, NY (US)

( * ) Notice: Subject to any disclaimer, the term of this patent is extended or adjusted under 35 U.S.C. 154(b) by 15 days.

(21) Appl. No.: 16/974,191

(22) Filed: Nov. 9, 2020

(65) Prior Publication Data
US 2021/0235877 A1    Aug. 5, 2021

Related U.S. Application Data

(62) Division of application No. 16/501,523, filed on Apr. 23, 2019, now Pat. No. 10,888,167.

(51) Int. Cl.
*A47C 16/00*    (2006.01)
*A47G 9/10*    (2006.01)
*F16M 13/04*    (2006.01)

(52) U.S. Cl.
CPC ............ *A47C 16/00* (2013.01); *A47G 9/1009* (2013.01); *A47G 9/1081* (2013.01); *F16M 13/04* (2013.01); *A47G 9/1027* (2013.01); *A47G 2009/1018* (2013.01)

(58) Field of Classification Search
None
See application file for complete search history.

(56) References Cited

U.S. PATENT DOCUMENTS

| | | | | |
|---|---|---|---|---|
| 5,044,026 A * | 9/1991 | Matthews | ............ | A47G 9/1054 5/644 |
| 5,454,623 A * | 10/1995 | Parks | ............ | A47C 16/005 297/4 |
| 6,202,236 B1 * | 3/2001 | Price | ............ | F41C 33/001 297/464 |
| 7,036,168 B1 * | 5/2006 | Knickerbocker | ...... | A61G 13/12 5/636 |
| 8,528,978 B2 * | 9/2013 | Purpura | ............ | B64D 11/0641 297/487 |
| 9,629,468 B1 * | 4/2017 | McCabe | ............ | A47C 7/383 |
| 10,383,444 B1 * | 8/2019 | Parkins | ............ | A47C 7/62 |
| 2004/0124685 A1 * | 7/2004 | Buch | ............ | B60N 3/004 297/393 |
| 2005/0056309 A1 * | 3/2005 | Bree | ............ | A47G 9/1045 135/147 |

(Continued)

*Primary Examiner* — David E Allred

(57) ABSTRACT

The present disclosure relates to a travel pillow. The travel pillow comprises a connecting rod having a first end and a second end, and a first pillow body and a second pillow body. Each of the first pillow body and the second pillow body comprises a frame and a soft cushion mounted on the frame. One end of the frame of the first pillow body is coupled to the first end of the connecting rod. The first pillow body is configured to be rotated at the first end of the connecting rods and locked at a predetermined angle. One end of the frame of the second pillow body is coupled to the second end of the connecting rod. The second pillow body is configured to be rotated at the second end of the connecting rods and locked at a predetermined angle. The travel pillow has a height which is adjusted by changing the angle between the first pillow body and the connecting rod and the angle between the second pillow body and the connecting rod. Moreover, a fastening means is used for carrying and securing the travel pillow.

24 Claims, 16 Drawing Sheets

(56) References Cited

U.S. PATENT DOCUMENTS

| | | | |
|---|---|---|---|
| 2007/0052274 A1* | 3/2007 | Morphew | A47D 15/00 297/392 |
| 2014/0033439 A1* | 2/2014 | Berhanu | A47C 16/00 5/640 |
| 2015/0274044 A1* | 10/2015 | Kreppein | A47G 9/1081 5/636 |
| 2015/0298589 A1* | 10/2015 | Zaouk | B60N 2/882 297/393 |
| 2017/0188715 A1* | 7/2017 | Hill | B60N 2/882 |
| 2018/0132621 A1* | 5/2018 | Scrimshaw | A47C 16/00 |
| 2019/0159601 A1* | 5/2019 | Hill | F16M 13/022 |
| 2019/0168707 A1* | 6/2019 | Jaradi | B60R 22/24 |
| 2019/0246819 A1* | 8/2019 | Lemoine | A63H 33/006 |
| 2021/0290467 A1* | 9/2021 | Wilkie | A47G 9/1081 |

\* cited by examiner

TRAVEL PILLOW

This patent application is a divisional to our prior patent application filed with the U.S. Patent and Trademark Office as Ser. No. 16/501,523 entitled "TRAVEL PILLOW" filed on Apr. 23, 2019.

TECHNICAL FIELD

The present disclosure relates to the field of travel goods, and more particularly to a travel pillow.

BACKGROUND

With the improvement of people's living standards, travel has become an important means for people to improve their quality of life. It may take a long time to travel by vehicles, airplanes, etc., and a traveler needs to maintain a secured posture or an uncomfortable posture for a long time, or has to rest or sleep in a place where there is no a bed. Therefore, the traveler may have the problems of muscle stiffness or exhaustion, especially neck soreness.

In order to relieve neck soreness, the traveler usually choose to carry a travel pillow so that the traveler can rest or sleep comfortably when sitting in an upright or forward position. One kind of travel pillows, according to conventional technology, comprises two pillow bodies that are connected by a joint and may be rotated at the joint. The traveler can adjust the relative positions of the two pillow bodies as needed to rest or sleep comfortably and to relieve fatigue.

However, there are still many problems in this travel pillow: 1) when a traveler want to lean forward on the front table on the plane, it may be difficult or uncomfortable to bend down because a distance between front and rear seats are not enough or the table position is too low; 2) when a belt is used to secure the travel pillow on a seat back, the head of a traveler can move freely left or right and is not fixed at desirable position while the traveler leans forward between the travel pillow and the seat back and rests against the travel pillow; 3) when a belt is used to secure the travel pillow on human chest of a traveler, the belt surrounding the back of the traveler's neck can put a lot of unwanted pressure on the traveler's neck.

SUMMARY OF THE DISCLOSURE

In view of the above problems, the present disclosure provides a travel pillow. By adjusting an angle between a first pillow body and the connecting rod and an angle between a second pillow body and the connecting rod and by using a fastening means, a traveler may have a comfortable rest posture whether resting on a small table or resting on a chair, which improves the comfort of rest and reduces or eliminates the unwanted pressure on human neck.

According to an embodiment of the present disclosure, there is provided a travel pillow, comprising: a connecting rod having a first end and a second end; and a first pillow body and a second pillow body, each of which has a frame and a soft cushion mounted on the frame, with one end of the frame being coupled to one of the first end and the second end of the connecting rod, wherein the first pillow body is configured to be rotated at the first end of the connecting rods and locked at a predetermined angle, and the second pillow body is configured to be rotated at the second end of the connecting rods and locked at a predetermined angle.

Preferably, the soft cushion is one selected for a group consisting of an airbag cushion, a cotton cushion, a sponge cushion a memory foam cushion, and their combinations.

Preferably, the soft cushion has a support surface having an inclined surface.

Preferably, the soft cushion has an opening for accommodating a user's face or supporting a user's neck.

Preferably, the travel pillow further comprises a first locking member and a second locking member, wherein the first end and the second end of the connecting rod comprise a first shaft and a first shaft hole respectively, the frame of the first pillow body comprises a second shaft hole through which the first shaft passes, the frame of the second pillow body comprises a second shaft which passes through the first shaft hole, and the first locking member and the second locking members engage with the first shaft and the second shaft respectively.

Preferably, each of the first locking member and the second locking member is a nut that allows the frames to rotate relative to the connecting rod in a released state, and locks an angular position of the frames relative to the connection rod in a fastened state.

Preferably, the travel pillow further comprises a first locking member and a second locking member, wherein the first end and the second end of the connecting rod comprise a first shaft hole and a second shaft hole respectively, the frame of the first pillow body comprises a third shaft hole, the frame of the second pillow body comprises a fourth shaft hole, the first locking member comprises a first shaft that passes through the first shaft hole and the third shaft hole, and the second locking member comprises a second shaft that passes through the second shaft hole and the fourth shaft hole.

Preferably, each of the first locking member and the second locking member comprises a screw and a nut that allows the frames to rotate relative to the connecting rod in a released state, and locks an angular position of the frames relative to the connection rod in a fastened state.

Preferably, each of the first locking member and the second locking member further comprises a flexible arm having a length larger than a diameter of a shaft hole, to prevent the locking member from falling out of the shaft hole in the released state.

Preferably, each of the first end and the second end of the connecting rod comprises a first surface with teeth protruding along an axial direction of a shaft, and an end of the frame comprises a second surface with teeth protruding along the axial direction of the shaft, and the first surface is separated from the second surface in a released state, and the first surface is engaged with the second surface in a fastened state.

Preferably, the one end of the frame of each of the first pillow body and the second pillow body comprises a branch portion, the first end and the second end of the connecting rod are clamped in the branch portion.

Preferably, each of the first end and the second end of the connecting rod comprises a first surface with teeth protruding along an axial direction of a shaft, the branch portion has a second surface which faces the first surface and is provided with teeth protruding along the axial direction of the shaft, and the first surface is separated from the second surface in a released state, and the first surface is engaged with the second surface in a fastened state.

Preferably, the travel pillow has an unfolded state and a folded state, and at least one of the first pillow body and the second pillow body is separated from the connecting rod in the unfolded state and both of the first pillow body and the second pillow body are closed to the connecting rod in the folded state.

Preferably, the travel pillow provides a two-piece mode and a three-piece mode in the unfolded state, in the two-piece mode, one of the first pillow body and the second pillow body is separated from the connecting rod, and the other of the first pillow body and the second pillow body is closed to the connecting rod, in the three-piece mode, both of the first pillow body and the second pillow body are separated from the connecting rod.

Preferably, in the unfolded mode, one of the first pillow body and the second pillow body contacts an outer surface.

Preferably, the outer surface is a surface of an object, human chest or human abdomen.

Preferably, the travel pillow further comprises a plurality of pads at the one end of the frame of the first pillow body and at the one end of the frame of the second pillow body, wherein the plurality of pad contacts the outer surface.

Preferably, when the outer surface is a surface of human chest or human abdomen, the travel pillow is secured on human body.

Preferably, the travel pillow further comprises a fastening means for fixing the travel pillow to an object or human body.

Preferably, the fastening means comprises: a first belt and a second belt; and a first buckle between one end of the first belt and one end of the second belt and is configured to adjust a length of at least one of the first belt and the second belt.

Preferably, the travel pillow further comprises: a second buckle between the other end of the first belt and the connecting rod; and a third buckle between the other end of the second belt and the connecting rod.

Preferably, the travel pillow further comprises: a second buckle between the other end of the first belt and the frame; and a third buckle between the other end of the second belt and the frame.

Preferably, the travel pillow further comprises: a plurality of belt loops, wherein the plurality of belt loops are located on a side surface of the soft cushion.

Preferably, the first belt and the second belt pass through the plurality of belt loops.

A travel pillow according to the present disclosure has a first pillow body and a second pillow body being coupled to and rotated at two ends of a connecting rod, so that the travel pillow can have a height which is adjusted according to an actual use situation, and the traveler can maintain a comfortable posture when sleeping on a small table or other place, without physical exhaustion, neck soreness and other problems, even in a case that the table is in a low position or the traveler rests for a long time.

A travel pillow according to the present disclosure includes surfaces with teeth, at two ends of the connecting rod, at an end of the frame of the first pillow body, and at an end of the frame of the second pillow body. After the height of the travel pillow has been adjusted and these surfaces are engaged with each other in a fastened state, the travel pillow will not change the height under the pressure of the traveler, thereby improving the traveler pillow's stability.

A travel pillow according to the present disclosure further includes a fastening mean for securing the travel pillow on an object or on human body, which not only increases usages of the travel pillow, but also reduces pressure on the neck of the traveler. There is no inconvenience when the traveler turns around or moves around. Moreover, the fastening means can also be used to secure the travel pillow to a handle or a case body of a trolley case. The travel pillow can be carried without occupying an inner space of the trolley case, and without the need for hands. Thus, the travel pillow has improved portability.

BRIEF DESCRIPTION OF THE DRAWINGS

The above and other objects, advantages and features of the present invention will become more fully understood from the detailed description given herein below in connection with the appended drawings, and wherein.

DETAILED DESCRIPTION

Figure 1:
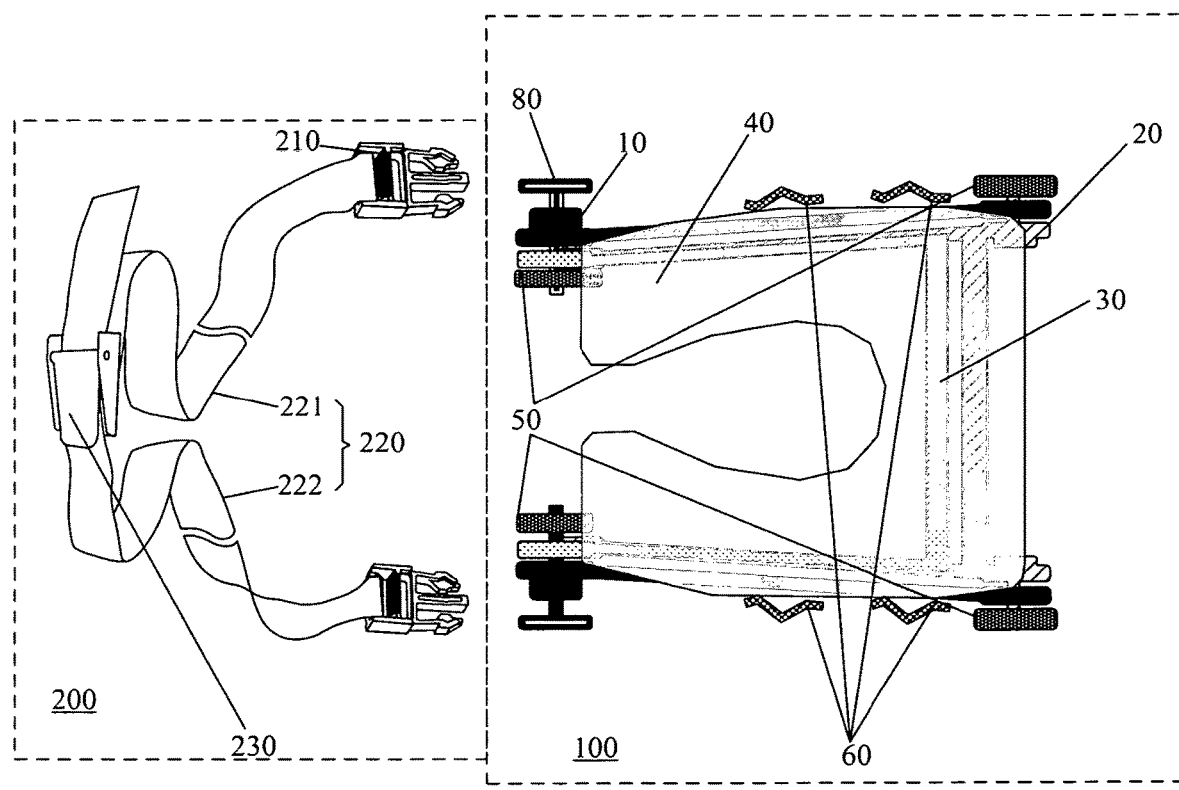
FIG. 1 is a top view showing a travel pillow according to a first embodiment of the present disclosure.

Exemplary embodiments of the present disclosure will be described in more details below with reference to the accompanying drawings. In the drawings, like reference numerals denote like members. The figures are not drawn to scale, for the sake of clarity.

Some particular details of the present disclosure will be described below, such as exemplary semiconductor structures, materials, dimensions, process steps and technologies of the semiconductor device, for better understanding of the present disclosure. However, it can be understood by one skilled person in the art that these details are not always essential for but can be varied in a specific implementation of the disclosure.

Hereinafter, the present disclosure will be described in detail with reference to the accompanying drawings.

Figure 2:
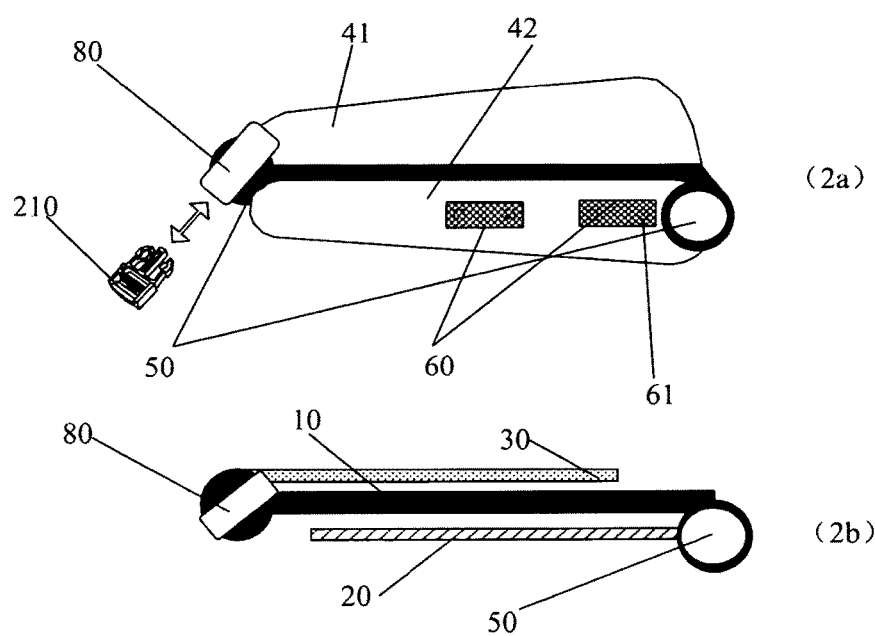
FIG. 2 is a side view showing the travel pillow in a folded state according to a first embodiment of the present disclosure.
Figure 3:
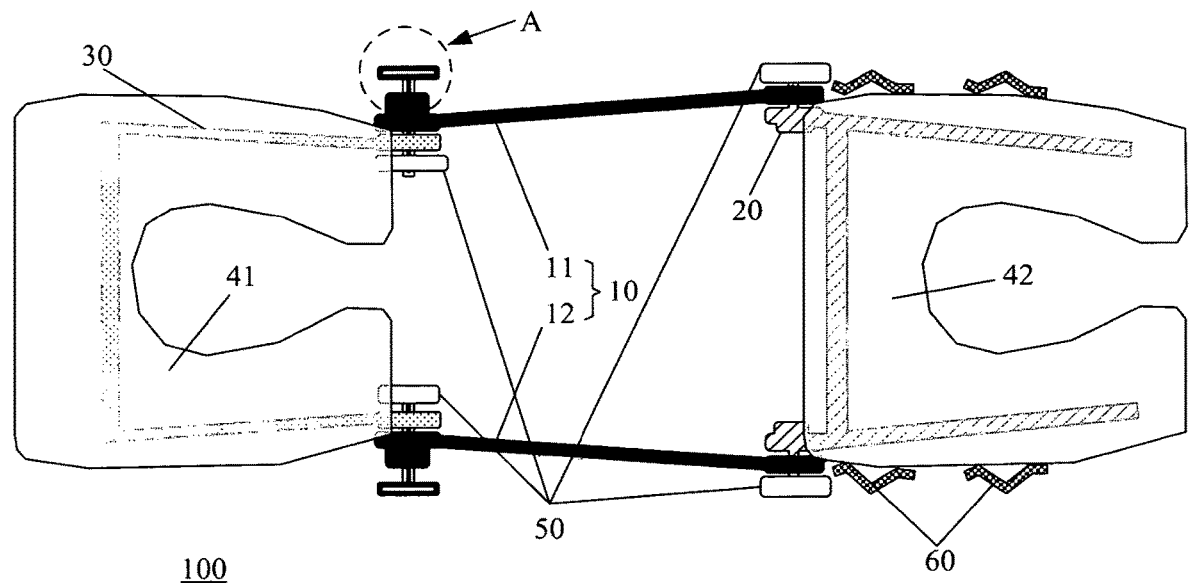
FIG. 3 is a side view showing the travel pillow in an unfolded state according to a first embodiment of the present disclosure.

FIG. 1 is a top view showing a travel pillow according to a first embodiment of the present disclosure, FIG. 2 is a side view showing the travel pillow in a folded state according to a first embodiment of the present disclosure, and FIG. 3 is a side view showing the travel pillow in an unfolded state according to a first embodiment of the present disclosure.

As shown in FIGS. 1, 2 and 3, the travel pillow 110 comprises a fastening means 200 and a pillow 100. The travel pillow 100 comprises a first pillow body 41, a second pillow body 42 and a connecting rod 10 connecting the first pillow body 41 and the second pillow body 42. The fastening means 200 comprises a first buckle 230, a second buckle and a third buckle (only buckle plugs 210 are shown), two belts 220.

In the fastening means 200, the first buckle 230 is fixedly connected to one end of a first belt 221, and is movably connected to one end of a second belt 222. The fastening means 200 has a length which can be adjusted by changing a connection position of the first buckle 230 and the second belt 222. The other end of the first belt 221 and the other end of the second belt 222 are connected to a connecting rod of the travel pillow 100 by the second buckle and the third buckle. In the fastening means 200, for example, the material of the first buckle 230 may be metal or plastic, the material of the belt 220 may be cloth or nylon, the material of the second buckle and the third buckle may be plastic. The use of the fastening means 200 allows the travel pillow 100 to be more flexible and comfortable to use.

In the travel pillow 100, the first pillow body 41 and the second pillow body 42 comprise a generally U-shaped soft cushion and a frame, and the connecting rod 10 movably connects the first pillow body 41 with the second pillow body 42. The first pillow body 41 and the second pillow body 42 are rotatable about the end of the connecting rod 10, thereby changing the angle between the first pillow body 41 and the connecting rod 10 and/or the angle between the second pillow body 42 and the connecting rod 10. The travel pillow 100 is unfolded into a flat shape. Referring to FIG. 3, the first pillow body 41 is aligned with the U-shaped opening of the second pillow body 42. Inside the first pillow body 41 and the second pillow body 42, there a frame 30 a frame 20 for support and connection, both of which are generally U-shaped frames. The soft cushions of the first pillow body 41 and the second pillow body 42 are both U-shaped pads in which the cloth is wrapped with a padding material, such as soft material airbags, cotton, sponges and memory foam and their combinations. The material of the connecting rod 10, the frame 30 and the frame 20 may be made of a suitably elastic or rigid material, such as metal, plastic, wood, or the like.

At the end of the connecting rod 10 with the frame 20 and the frame 30, respectively, there is a locking member 50 for fixing, and the locking member 50 may be a nut, which preventing the connection of the frame 20 or the frame 30 and the connecting rod 10 on the same central axis from coming off. At the first end of the connecting rod 10 and the frame 30, there are buckle sockets 80 into which the buckle plugs 210 may be inserted, as the second buckle and the third buckle of the fastening means 200, for connecting the fastening means 200 with the travel pillow 100.

Referring to FIG. 2 and FIG. 3, two pairs of belt loops 60 are symmetrically secured on the two sides of the second pillow body 42 respectively, one pair is symmetrically secured to a more central position of the side of the second pillow body 42, and the other pair is symmetrically secured to a position of the second pillow body 42 near the end. The material of the belt loop 60 may be a nylon cloth, an elastic band, or the like.

Figure 4A:
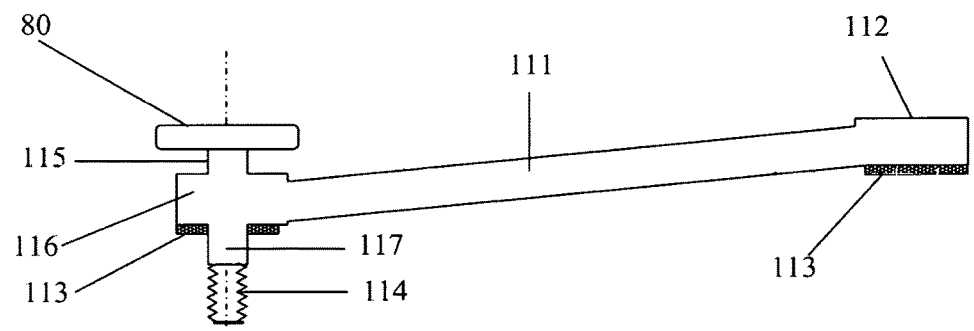
FIG. 4a-4c are partial views showing a travel pillow according to a first embodiment of the present disclosure.
Figure 4B:
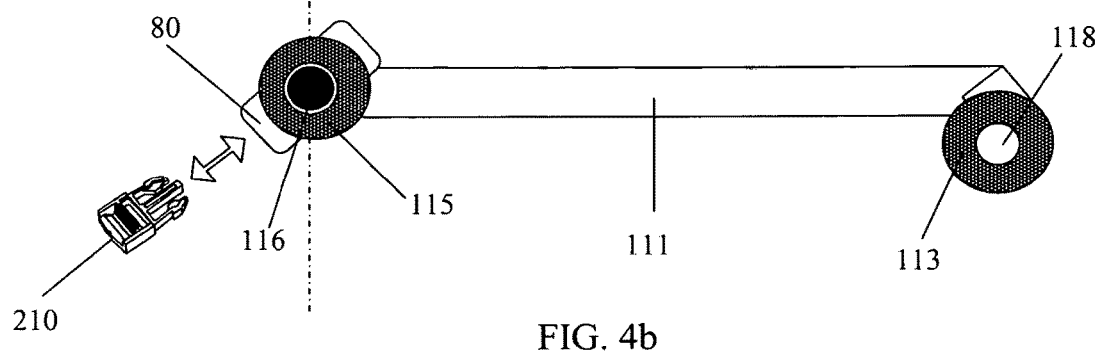
Figure 4C:
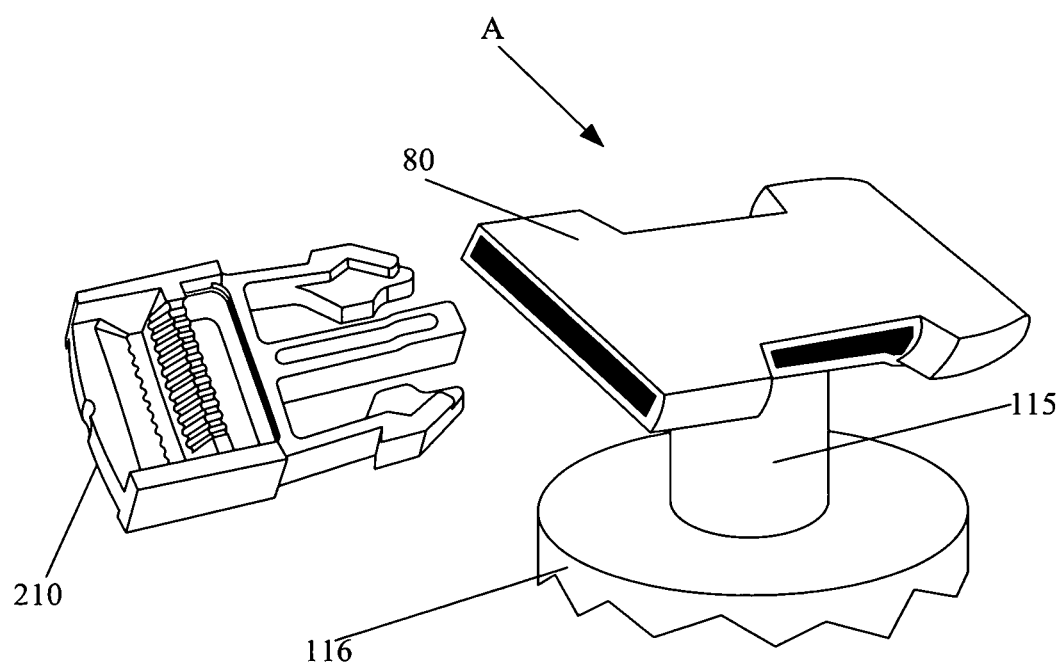

As shown in FIG. 4a to FIG. 4c, the connecting rod (for example, the connecting rod 10 shown in FIGS. 1 to 3) comprises an arm 111. A first end of the connecting rod 10 is coupled with a frame of a first pillow body 41, and a second end of the connecting rod 10 is coupled with a frame of a second pillow body 42.

Specifically referring to FIGS. 4a and 4b, the connecting rod 10 has a first end 116, which has a solid cylindrical shape with a pillar 115 at one end surface and a screw 117 at the other end surface. The first end 116, the pillar 115 and the screw 117 has a common central axis. The other end surface is used as a contact surface and has a rough surface 113 around the screw 117. An outer surface of the screw 117 is provided with an external thread 114. The buckle plug 80 is formed on the pillar 115, as shown in FIG. 4c. The buckle plug 210 is engaged with the buckle socket 80, as the second buckle and the third buckle of the fastening means 200, for connecting and disconnecting the belts of the fastening means 200 with the travel pillow 100. The second buckle and the third buckle may be those used in an automobile seat.

Specifically referring to FIGS. 4a and 4b, the connecting rod 10 comprises a second end 112, which has a solid cylindrical shape with a shaft hole 118 at the central axis and has a rough surface 113 at one end surface that is a contact surface.

Figure 5:
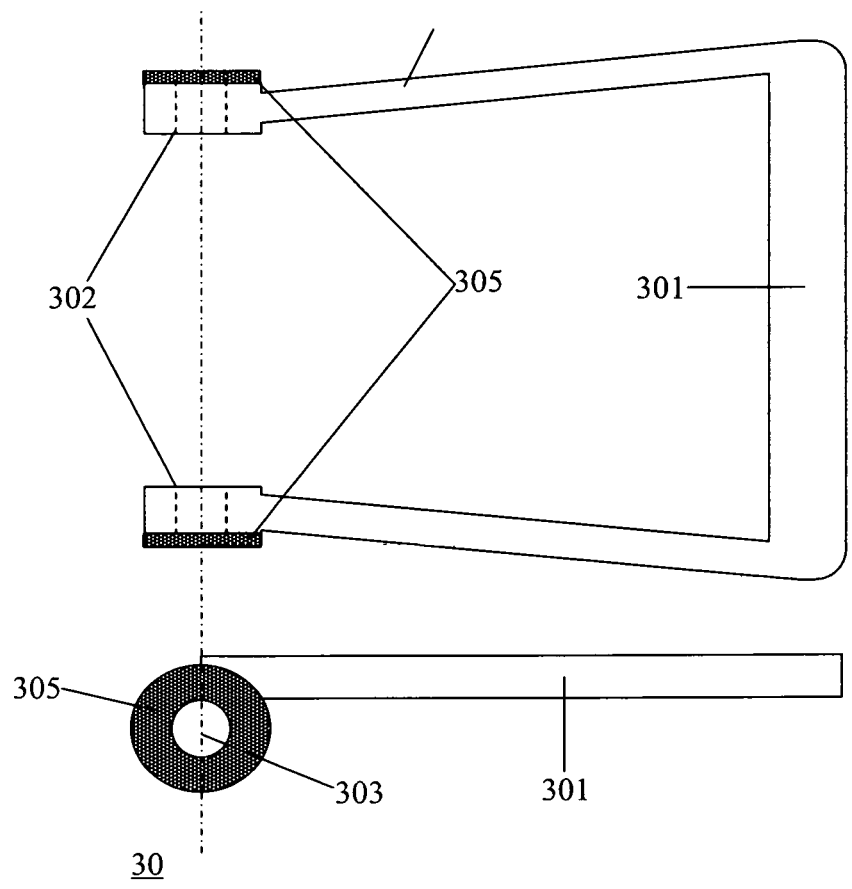
FIG. 5 is a structural diagram showing a frame of a first pillow body of a travel pillow according to a first embodiment of the present disclosure.
Figure 6:
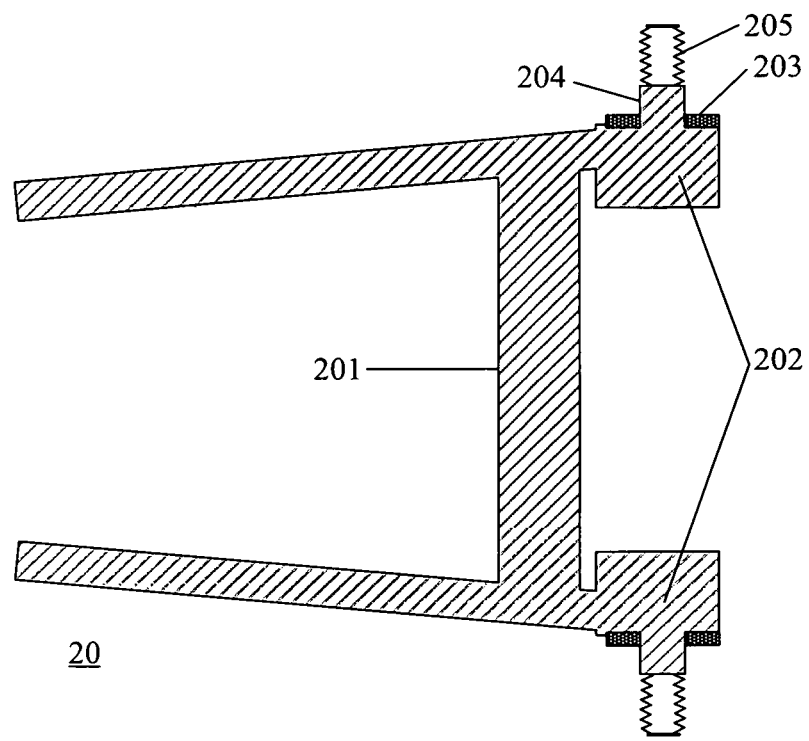
FIG. 6 is a structural diagram showing a frame of a second pillow body of a travel pillow according to a first embodiment of the present disclosure.

FIGS. 5 and 6 are structural diagrams of a U-shaped frame. Specifically, FIG. 5 is a structure diagram of a frame of the first pillow body, and FIG. 6 is a structure diagram of a frame of the second pillow body.

Referring to FIG. 5, the frame 30 of the first pillow body 41 comprises a U-shaped frame arm 301 and ends 302, and the ends 302 are respectively connected at both ends of the U-shaped frame. The end 302 has the same shape and outer diameter as the end 112 of the connecting rod 10. The inner diameter, that is, the diameter of the shaft hole 303 is slightly larger than the diameter of the first end 116. Therefore, the shaft hole 303 is capable of passing through the external thread 114 and the screw 117, such that the frame 30 is movably coupled to the connecting rod 10. On the two sides of the end 302 close to the connecting rod 10, there are respectively anti-slip members 305 that are shape matching to the connecting rod 10, and in cooperation with the rough surface 113 of the connecting rod 10, which is capable of making the first pillow body 41 and the connecting rod 10 be maintained at a set angle without deformation.

Referring to FIG. 6, the frame 20 of the second pillow body 42 is connected in the same manner as the second end of the connecting rod 10. As shown, the frame 20 of the second pillow body 42 comprises a U-shaped frame 201, ends 202 on both sides of the bottom of the U-shaped frame 201, and a fourth cylinder 204, a fifth cylinder 205 having a thread shape, and an end of a connecting rod of a travel pillow 203 which are on the same axis as the center of the end 202. The anti-slip member 203 is located at the end 202 on both sides of the connecting rod 10. The diameters of the fourth cylinder 204 and the fifth cylinder 205 are slightly smaller than the diameter of the shaft hole 118 of the end 112 of the connecting rod 10, and therefore, the shaft hole 118 is capable of passing through the fourth cylinder 204 and the fifth cylinder 205, so that the frame 20 is movably coupled to the connecting rod 10. The anti-slip member 203 of the second pillow body 42 is used in conjunction with the rough surface 113 of the connecting rod 10 to maintain the second pillow body 42 and the connecting rod 10 at a set angle without deformation.

Figure 7A:
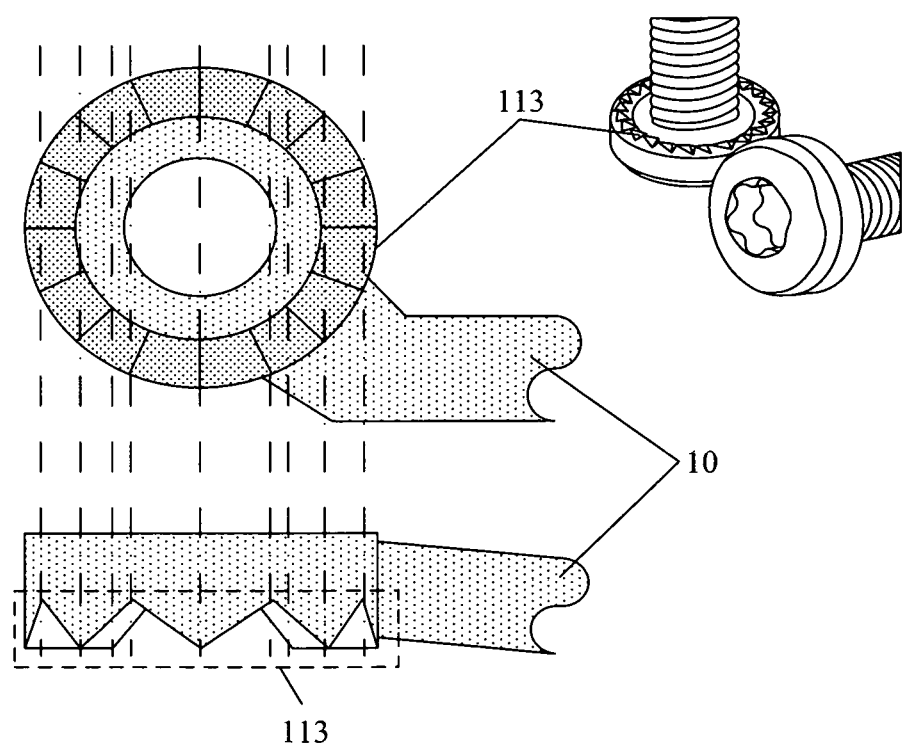
FIG. 7a is a structural diagram showing an end of a connecting rod of a travel pillow according to a first embodiment of the present disclosure.
Figure 7B:
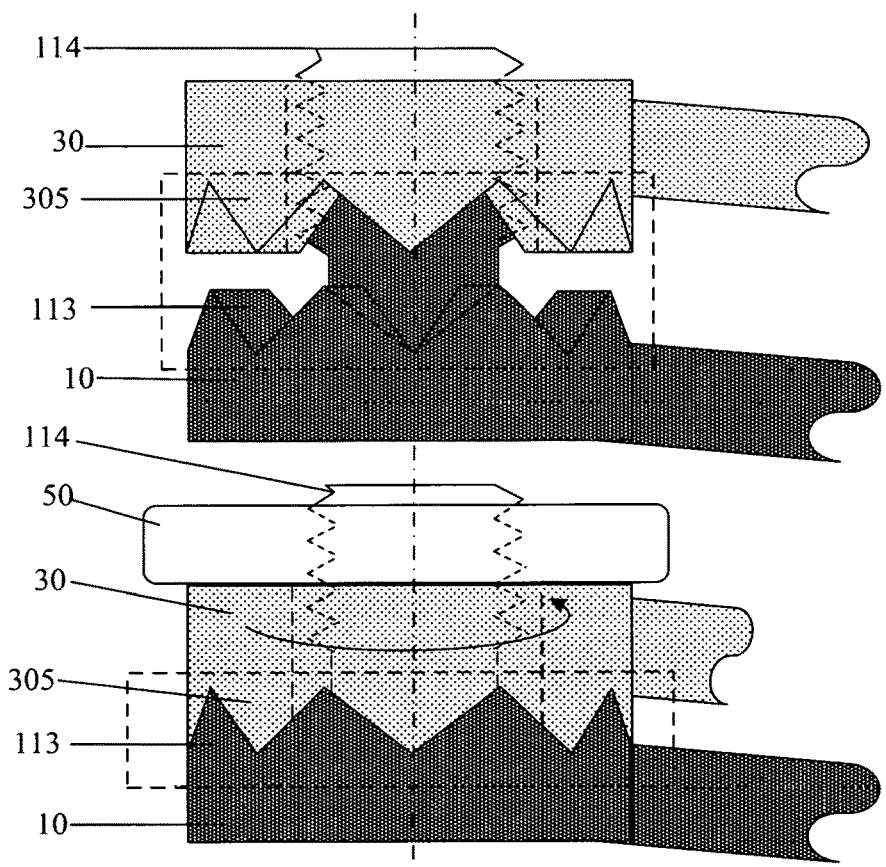
FIG. 7b is a structural diagram showing an end of a connecting rod and an end of a frame of a pillow body of a travel pillow according to a first embodiment of the present disclosure.

FIG. 7a shows a structural diagram of the non-slip member according to a first embodiment of the present disclosure, and FIG. 7b shows an application diagram of the anti-slip member.

Taking the rough surface 113 of the connecting rod 10 as an example, referring to FIG. 7a, the rough surface 113 is saw-toothed, and the shape of each of a protruding teeth and each of a recessed tooth is at least partially engageable. Referring to FIG. 7b, taking the first end of the connecting rod 10 and the frame 30 as an example, the external thread 114 and the screw 117 of the connecting rod 10 sequentially pass through the shaft hole 303 of the frame 30, rotating the frame 30, adjusting the relative angle between the connecting rod 10 and the frame 30, and the connecting rod 10 and the frame 30 are brought close again, so that the anti-slip members 113 and 305 are in contact with each other. Slightly adjusting the relative angle between the connecting rod 10 and the frame 30, so that the protruding teeth of the rough surface 113 correspond to the recessed teeth of the anti-slip member 305, the recessed teeth of the rough surface 113 correspond to the protruding teeth of the anti-slip member 305. Then using the locking member 50 to pass through the external thread 114 of the connecting rod 10, and rotating the locking member along the thread of the surface of the external thread 114 to approach the frame 30, and the locking member 50 is rotated until it cannot be rotated again. At this time, the frame 30 is maintained at a secured angle with the connecting rod 10 and does not change due to external forces.

Figure 8:
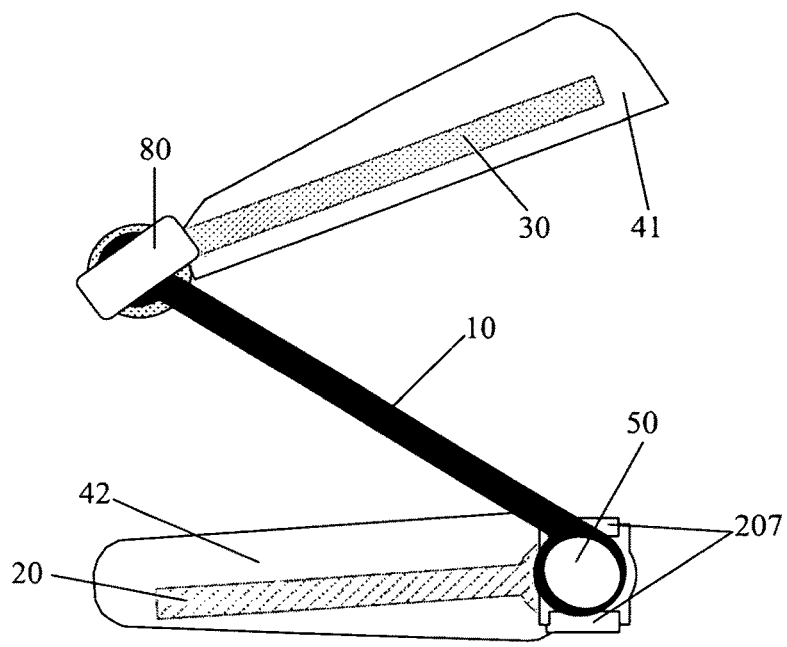
FIG. 8 is a side view showing a travel pillow according to a second embodiment of the present disclosure.
Figure 9:
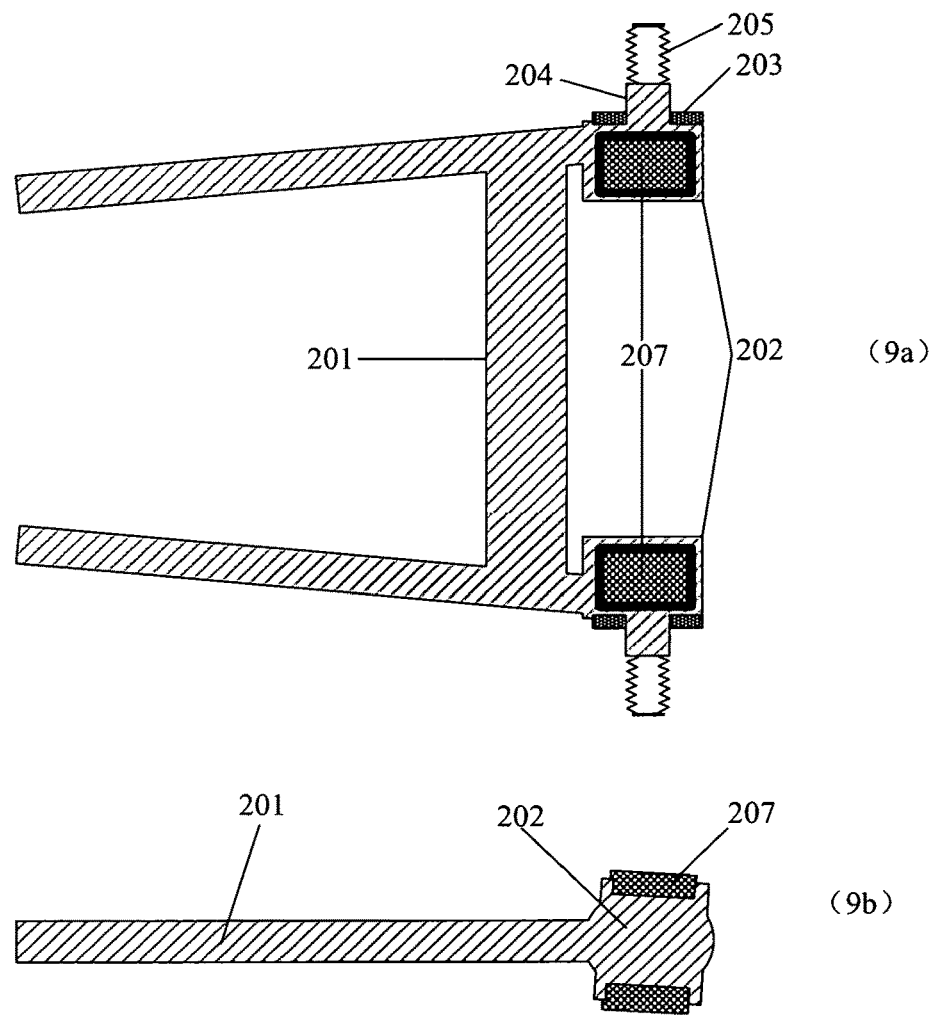
FIG. 9 is a structural diagram showing a frame of a second pillow body of a travel pillow according to a second embodiment of the present disclosure.

FIG. 8 is a side view showing a travel pillow according to a second embodiment of the present disclosure, FIG. 9 is a structural diagram showing a frame of a second pillow body of a travel pillow according to a second embodiment of the present disclosure. The second embodiment differs from the first embodiment in the frame 20 of the second pillow body 42, and the same points as the first embodiment will not be repeated here.

Referring to FIGS. 8 and 9, a frame 20 of the second embodiment comprises a U-shaped frame 201, ends 202 respectively connected to both sides of the bottom of the U-shaped frame 201, a fourth cylinder 204 on the same straight line as the center of the end 202, and a fifth cylinder 205 having a threaded side, on the sides of the end 202 close to the connecting rod 10, there is also an end of a connecting rod of a travel pillow 203. The diameters of the fourth cylinder 204 and the fifth cylinder 205 are slightly smaller than the diameter of the shaft hole 118 of the end 112 of the connecting rod 10, and therefore, the shaft hole 118 is capable of passing through the fourth cylinder 204 and the fifth cylinder 205, so that the frame 20 is movably coupled to the connecting rod 10. The non-slip member 203 of the second pillow body 42 is used in conjunction with the rough surface 113 of the connecting rod 10 to maintain the second pillow body 42 and the connecting rod 10 at a set angle without change. In addition, inside the end 202, a pad 207 having a rectangular parallelepiped shape is further comprised, and the supporting block 207 is wrapped inside by the end 202, and only the upper and lower sides are exposed, so that pillow 100 can stand firmer when placed on the table as a pillow.

Figure 10:
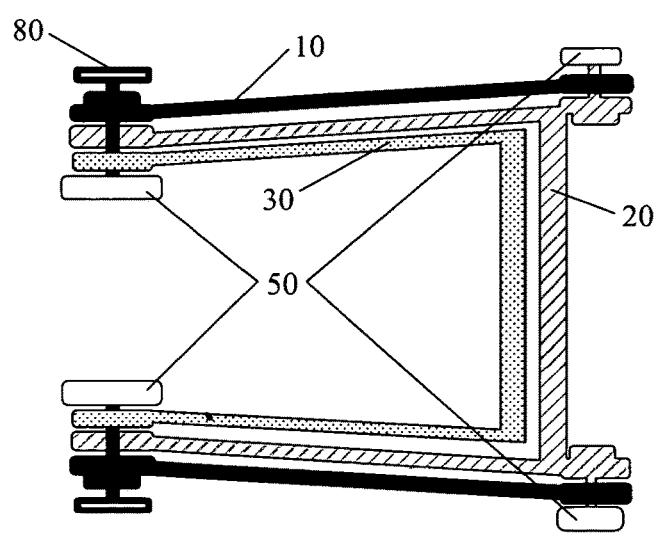
FIG. 10 is a structural diagram showing a travel pillow according to a third embodiment of the present disclosure.
Figure 11:
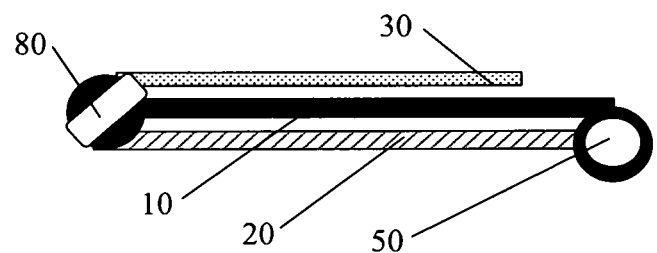
FIG. 11 is a side view showing a travel pillow according to a third embodiment of the present disclosure.
Figure 12:
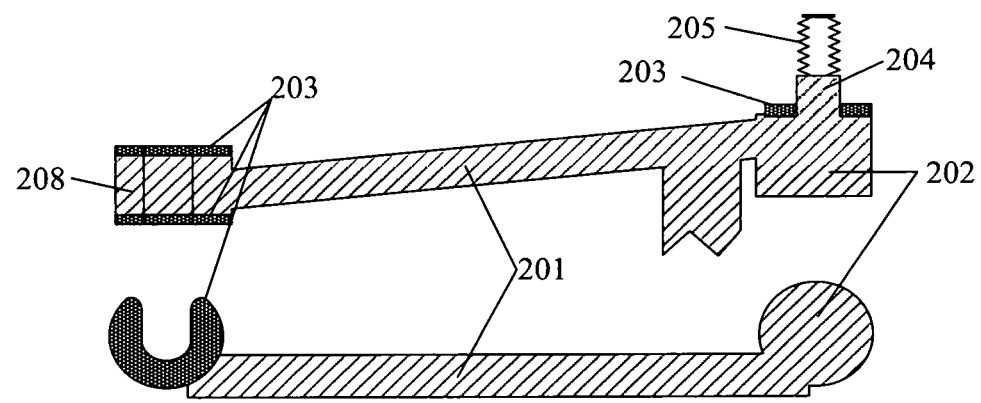
FIG. 12 is a structural diagram showing a frame of a second pillow body of a travel pillow according to a third embodiment of the present disclosure.

FIG. 10 is a structural diagram showing a travel pillow according to a third embodiment, FIG. 11 is a side view showing a travel pillow according to a third embodiment, FIG. 12 is a structural diagram showing a frame of a second pillow body of a travel pillow according to a third embodiment. The third embodiment differs from the first embodiment in the frame 20 of the second pillow body 42, and the same points as the first embodiment will not be repeated here.

Referring to FIGS. 10, 11 and 12, a frame 20 of the second embodiment comprises a U-shaped frame 201, ends 202 respectively connected to both sides of the bottom of the U-shaped frame 201, a fourth cylinder 204 on the same straight line as the center of the end 202, and a fifth cylinder 205 having a threaded side, on the sides of the end 202 close to the connecting rod 10, there is also an end of a connecting rod of a travel pillow 203. The diameters of the fourth cylinder 204 and the fifth cylinder 205 are slightly smaller than the diameter of the shaft hole 118 of the end 112 of the connecting rod 10, and therefore, the shaft hole 118 is capable of passing through the fourth cylinder 204 and the fifth cylinder 205, so that the frame 20 is movably coupled to the connecting rod 10. The non-slip member 203 of the second pillow body 42 is used in conjunction with the rough surface 113 of the connecting rod 10 to maintain the second pillow body 42 and the connecting rod 10 at a set angle without change. The U-shaped open end of the frame 20 further has an engaging block 208 respectively. When the frame 20 is rotated around the second end to be close to the connecting rod 10, the engaging block 208 is engaged with the first end to be engaged. The two sides of the block 208 also have anti-slip members 203, respectively.

Figure 13:
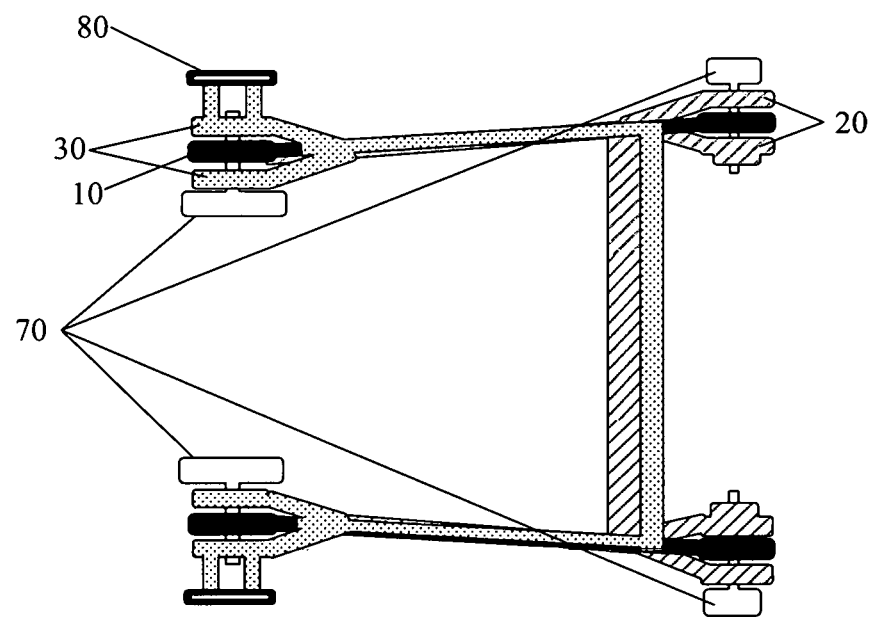
FIG. 13 is a top view showing a travel pillow according to a fourth embodiment of the present disclosure.
Figure 14:
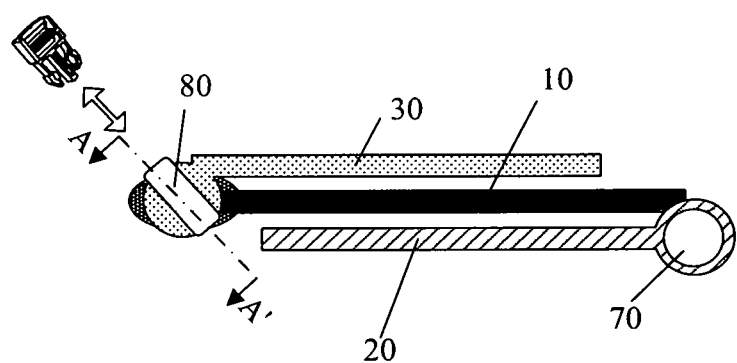
FIG. 14 is a side view showing a travel pillow according to a fourth embodiment of the present disclosure.
Figure 15:
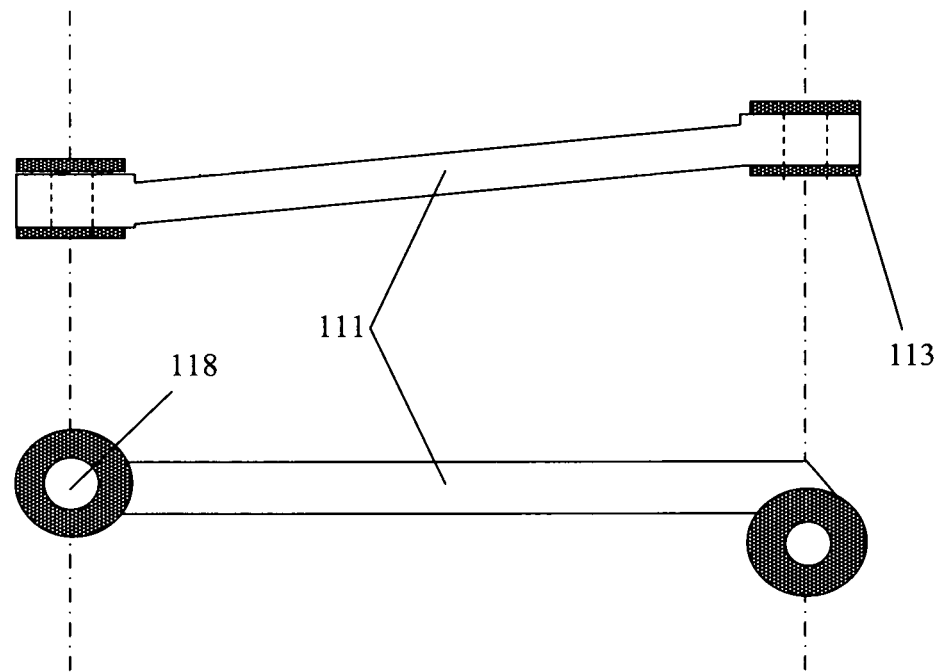
FIG. 15 is a structural diagram showing a connecting rod according to a fourth embodiment of the present disclosure.
Figure 16:
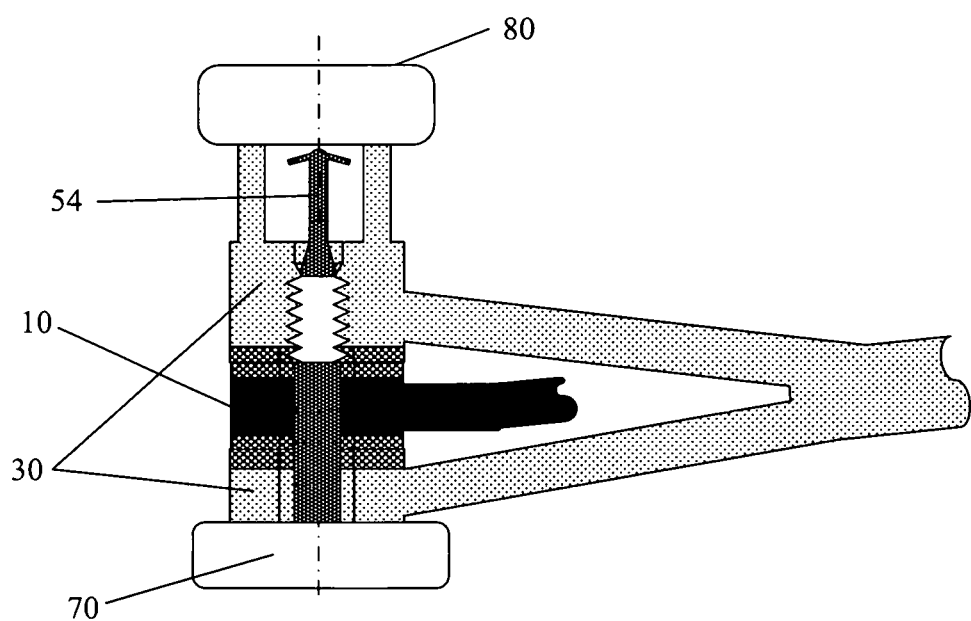
FIG. 16 is a cross-sectional view taken along line A-A' in FIG. 14 of the present disclosure.
Figure 17:
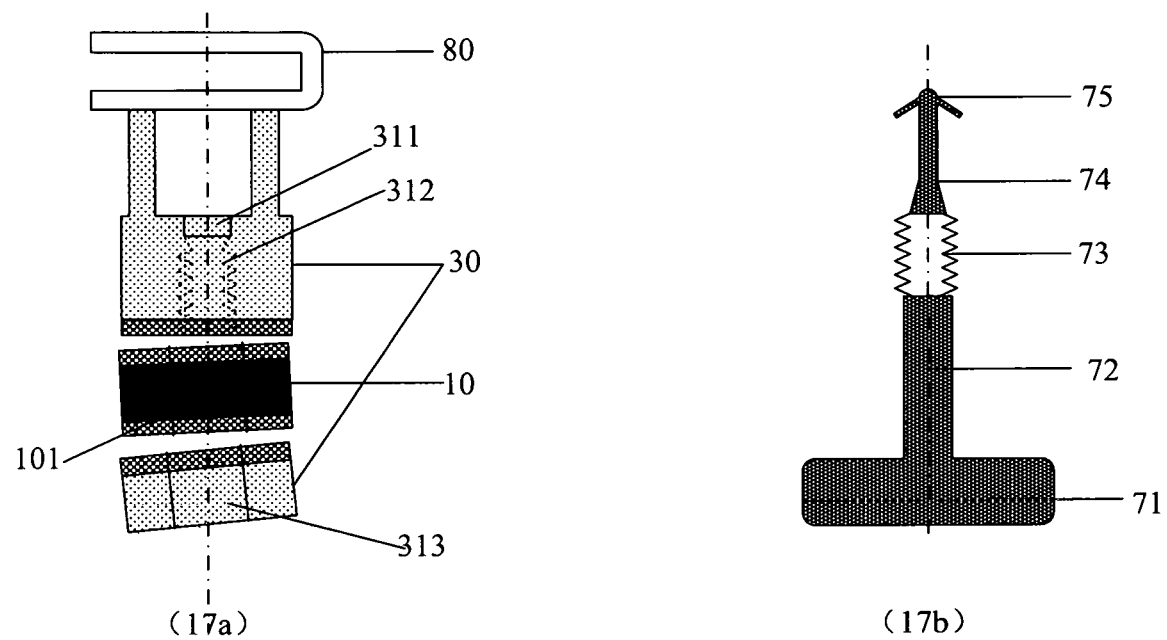
FIG. 17 is a cross-sectional view showing separate components of FIG. 16 of the present disclosure.
Figure 18:
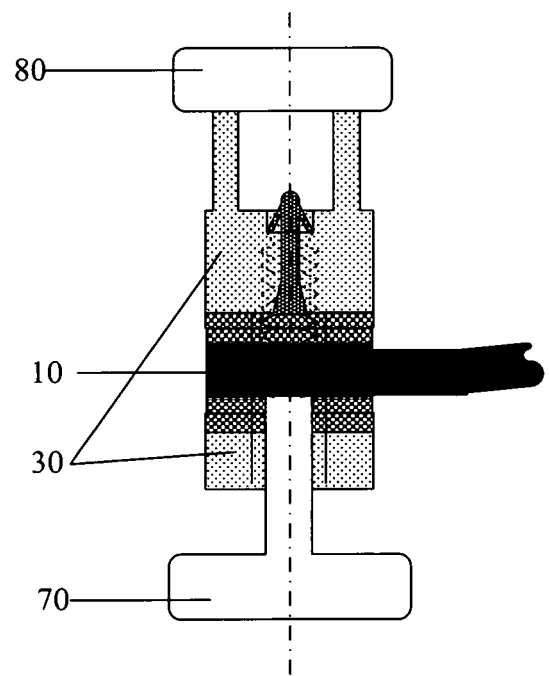
FIG. 18 is a schematic diagram showing locking mechanism of a travel pillow according to a fourth embodiment of the present disclosure.

FIG. 13 is a top view showing a travel pillow according to a fourth embodiment, FIG. 14 is a side view showing a travel pillow according to a fourth embodiment, FIG. 15 is a structural diagram showing a connecting rod according to a fourth embodiment, FIG. 16 is a cross-sectional view taken along line A-A' in FIG. 14, FIG. 17 is a cross-sectional view showing separate components of FIG. 16, FIG. 18 is a schematic diagram showing locking mechanism of a travel pillow according to a fourth embodiment;

Referring to FIGS. 13 to 15, the travel pillow frame of the fourth embodiment comprises a frame 30 of the first pillow body 41, a frame 20 of the second pillow body 42, a connecting rod 10 for connecting the first pillow body 41 and the second pillow body 42, and a locking member 70 for locking the structure at the connection end.

The ends of the connecting rods 10 respectively have shaft holes 118 and non-slip members 113. The end of the frame 20 and the frame 30 is a bifurcated structure, and the inside of the bifurcated structure has an end of a connecting rod of a travel pillow and a shaft hole, and the end of the connecting rod 10 can be fitted into the bifurcated end of the frame 20 and the frame 30. On the side surface of the end of the frame 30, a buckle socket 80 is also connected for connection with the fastening means 200.

Taking the end of the frame 30 and the connecting rod 10 as an example, referring to FIG. 16 and FIG. 17, at the bifurcated connection end of the frame 30, there is a first cylindrical shaft hole 311, a second cylindrical shaft hole 312 and a third cylindrical shaft hole 313, the diameter of the first cylindrical shaft hole 311 is smaller than the diameter of the third cylindrical shaft hole 313, and the diameter of the second cylindrical shaft hole 312 is also smaller than the diameter of the third cylindrical shaft hole 313, but the side surface of the second cylindrical shaft hole 312 is threaded. The connecting rod 10 has a cylindrical shaft hole 118 having the same diameter as the third cylindrical shaft hole 313.

The locking member 70 is a unitary structure composed of a sixth cylinder 71, a seventh cylinder 72, an eighth cylinder 73, a ninth cylinder 74, and a flexible arm 75. The diameter of the sixth cylinder 71 is larger than the diameter of the shaft hole 118. The diameter of the seventh cylinder 72 is smaller than the diameter of the shaft hole 118, the diameter of the eighth cylinder 73 is slightly smaller than the diameter of the second cylindrical shaft hole 312, and the side surface of the eighth cylinder 73 is threaded, and matching the side surface threads of the second cylindrical shaft hole 312, and the diameter of the ninth cylinder 74 is smaller than the diameter of the seventh cylinder 72, and the length is larger than the sum of the lengths of the first cylindrical shaft hole 311 and the second cylindrical shaft hole 312. The diameter of the flexible arm 75 is larger than the diameter of the first cylindrical shaft hole 311. The flexible arm 75 can effectively prevent the loosening of the locking member 70 without knowingly, as shown in FIG. 18.

When connected, the end of the connecting rod 10 is located in the bifurcated opening of the frame 30, and the elastic arm 75 of the locking member 70 sequentially passes through the third cylindrical shaft hole 313, the cylindrical shaft hole 101, the second cylindrical shaft hole 312, and the first cylindrical shaft hole 311, then rotating the locking member 70, and the thread matching the eighth cylinder 73 with the second cylindrical shaft hole 312 causes the locking member 70 to continue inward until the locking member 70 cannot rotate. At this time, the connecting rod 10 is locked with the frame 30 and is in a secured state. When needed to adjust the relative angle of the connecting rod 10 and the frame 30, the partial cylindrical structure of the locking member 70 is rotated out, and then the frame 30 and the connecting rod 10 are adjusted to a suitable angle, and the locking member 70 is rotated again to lock the connecting rod 10 with the frame 30. Similarly, the relative angle of the connecting rod 10 and the frame 20 is capable of being adjusted in the same way to keep the travel pillow 100 in a proper state, and the traveler can use the travel pillow 100 to have a comfortable rest.

Figure 19:
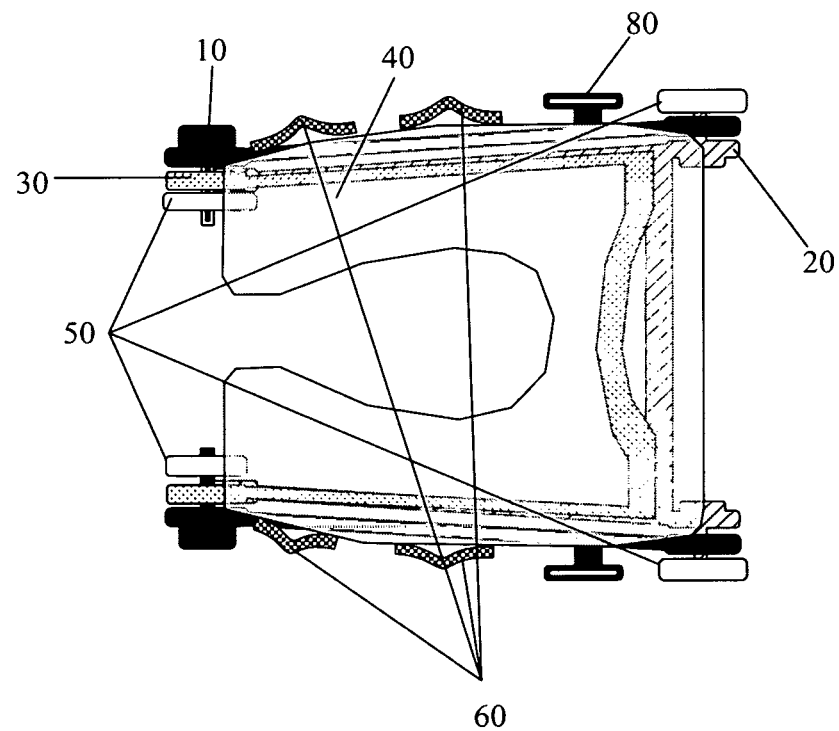
FIG. 19 is a schematic diagram showing a travel pillow according to a fifth embodiment of the present disclosure.
Figure 20:
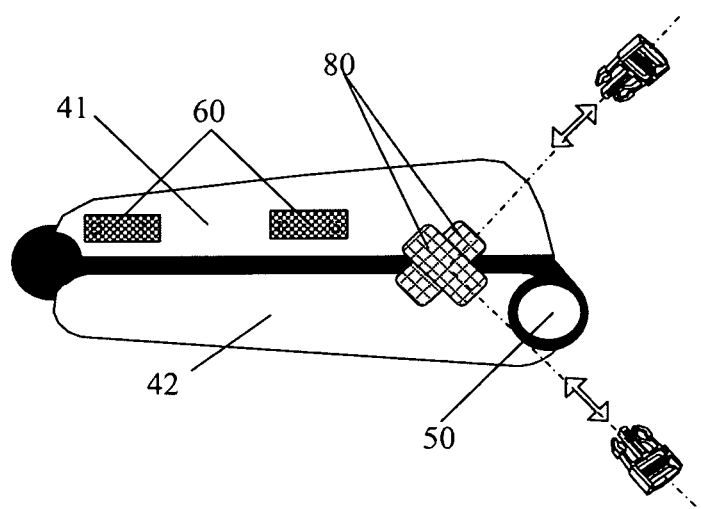
FIG. 20 is a side view showing the travel pillow in a folded state according to a fifth embodiment of the present disclosure.
Figure 21:
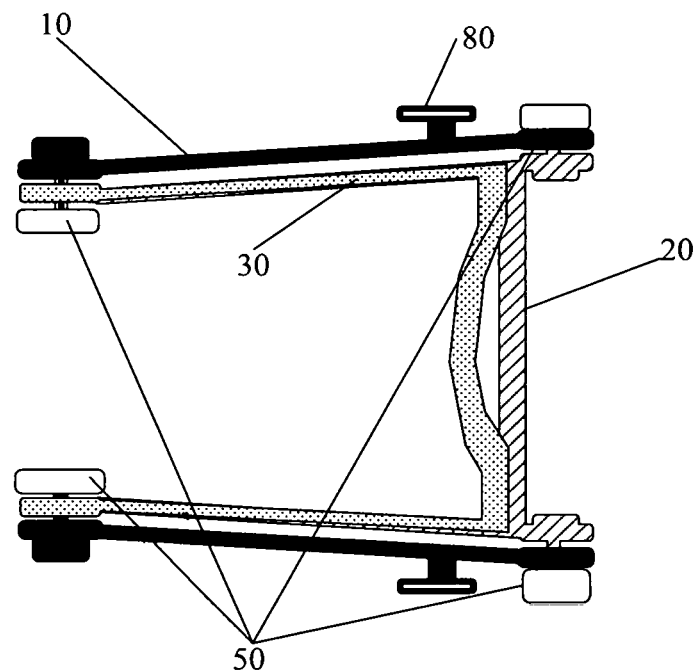
FIG. 21 is a structural diagram showing a travel pillow according to a fifth embodiment of the present disclosure.
Figure 22:
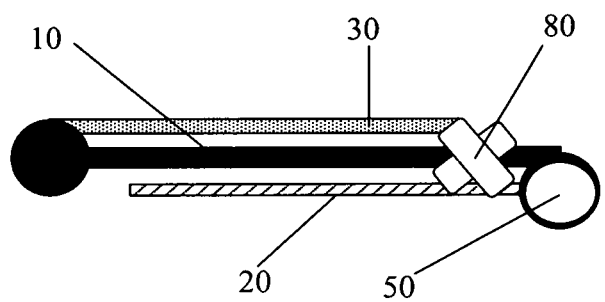
FIG. 22 is a side view showing a travel pillow according to a fifth embodiment of the present disclosure.
Figure 23:
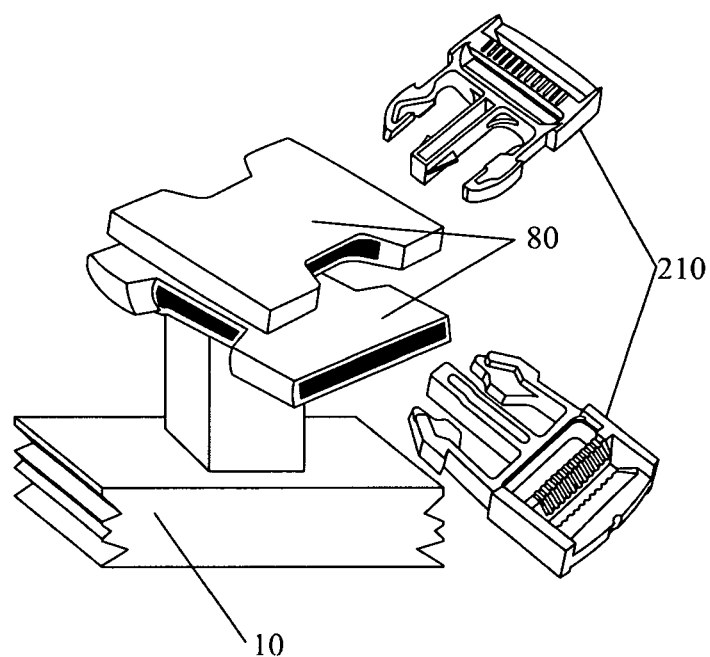
FIG. 23 is a structural diagram showing a fastening means of a travel pillow according to a fifth embodiment of the present disclosure.

FIG. 19 is a schematic diagram showing a travel pillow according to a fifth embodiment, FIG. 20 is a side view showing the travel pillow in a folded state according to a fifth embodiment, FIG. 21 is a structural diagram showing a travel pillow according to a fifth embodiment, FIG. 22 is a side view showing a travel pillow according to a fifth embodiment, FIG. 23 is a structural diagram showing a fastening means of a travel pillow according to a fifth embodiment.

Referring to FIGS. 19 to 23, the fifth embodiment is different from the first embodiment in that the buckle socket 80 is located at the connection end of the connecting rod 10 close to the second pillow body 42, and two socket members 80 are secured on each side of the cross shape, as shown in FIG. 23. Moreover, the belt loop 60 is secured to both sides of the first pillow body 41, as shown in FIG. Further, the U-shaped bottom of the frame 30 of the first pillow body 41 is an arcuate bottom recessed inward.

Figure 24:
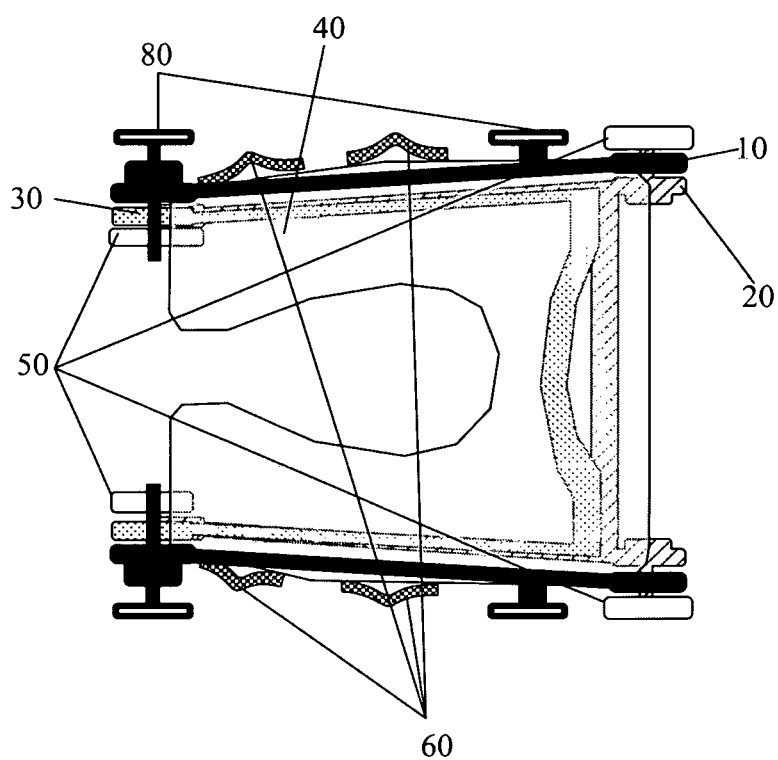
FIG. 24 is a schematic diagram showing a travel pillow according to a sixth embodiment of the present disclosure.

FIG. 24 is a schematic diagram showing a travel pillow according to a sixth embodiment.

Referring to FIG. 24, the sixth embodiment differs from the fifth embodiment in that the travel pillow 100 has two pairs of socket members 80, one of which is identical in position to the first embodiment, and another pair of which is the same as the position of the fifth embodiment.

The travel pillow according to the present disclosure is capable of selecting different modes according to the specific use environment, so that the traveler can use the travel pillow to achieve a comfortable rest regardless of the circumstances. FIGS. 25 and 26 show an application diagram of the travel pillow of the present disclosure, which is well suited for use when a person is sitting, such as when it's by airplane, train, car, or the like. According to the state of use, a travel pillow according to the present disclosure has three modes of use: a back cushion, a prone pillow, and a vertical pillow. The following three modes will be briefly introduced.

The first mode: a back cushion. The travel pillow 100 is folded into a minimum state. As shown in FIG. 1, the first pillow body 41 and the second pillow body 42 are close to the connecting rod 10, and the neck is passed through the U-shaped opening of the travel pillow 100, and is used as a soft cushion as a U-shaped pillow. Because both the first pillow body 41 and the second pillow body 42 comprise a soft cushion made of a soft material, so that when used as a back cushion, there is no pressure feeling, and the pressure of the frame on the neck is not felt, and it is comfortable to use.

Figure 25A:
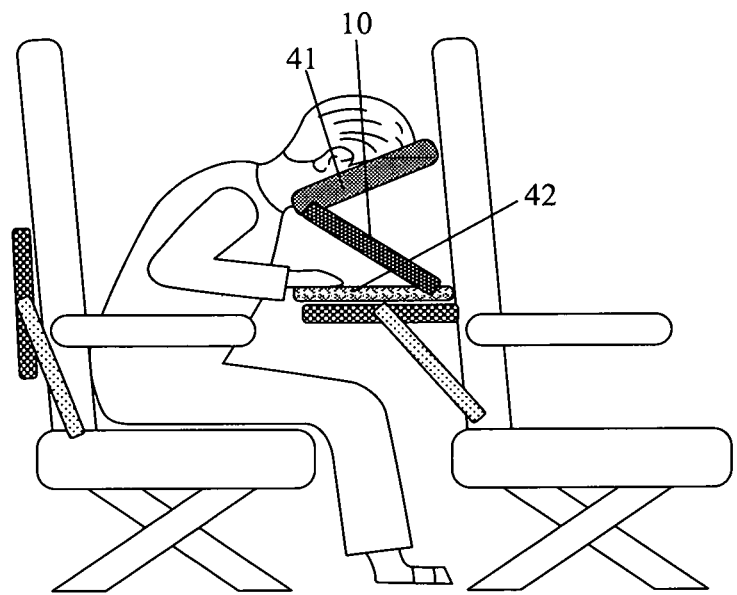
FIGS. 25a and 25b are schematic diagrams showing of a travel pillow in a second mode according to an embodiment of the present disclosure.
Figure 25B:
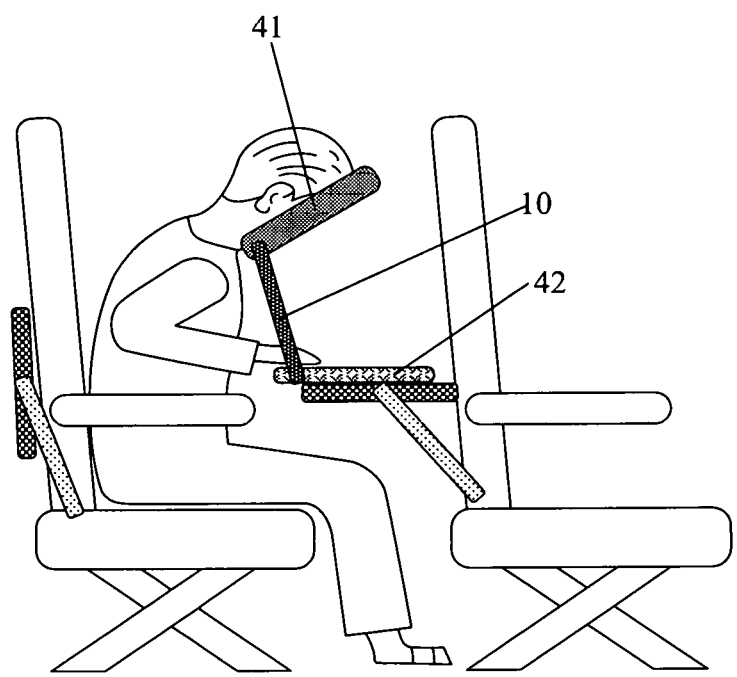
Figure 26A:
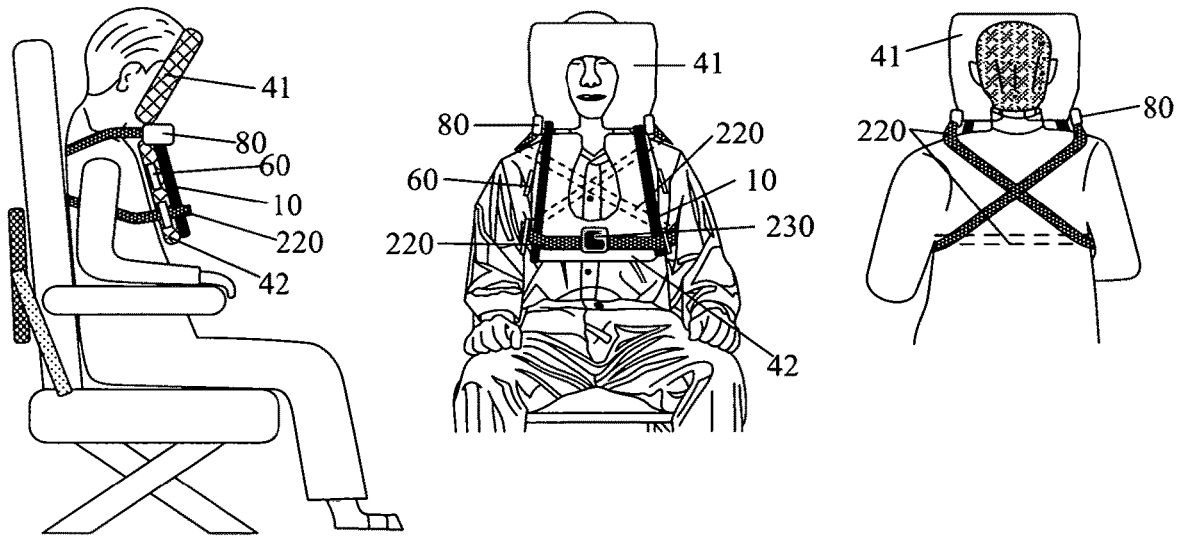
FIG. 26a-26d are schematic diagrams showing of a travel pillow in a third mode according to an embodiment of the present disclosure.
Figure 26B:
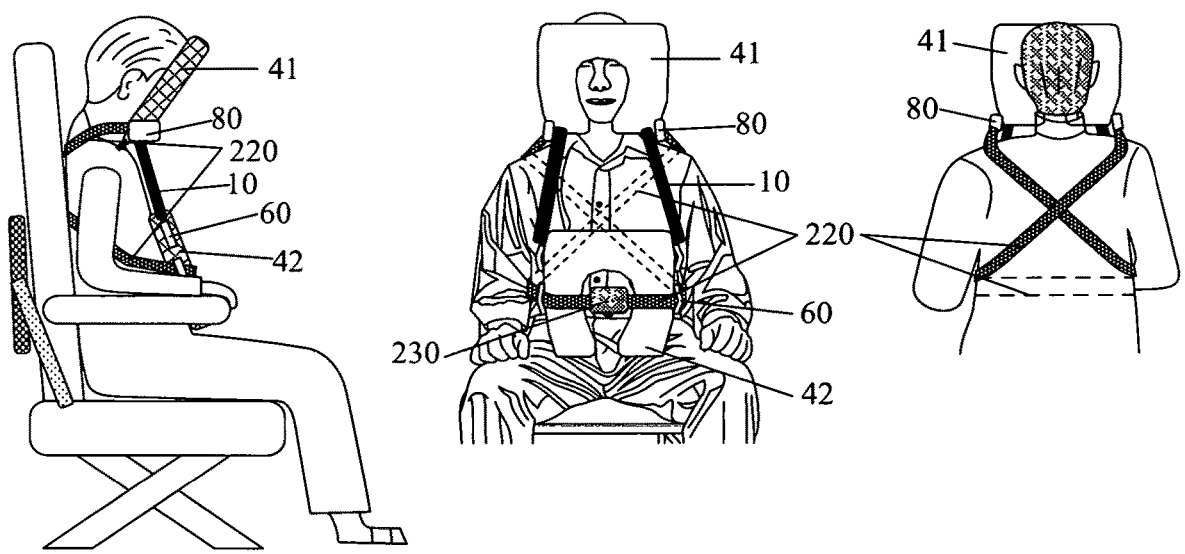
Figure 26C:
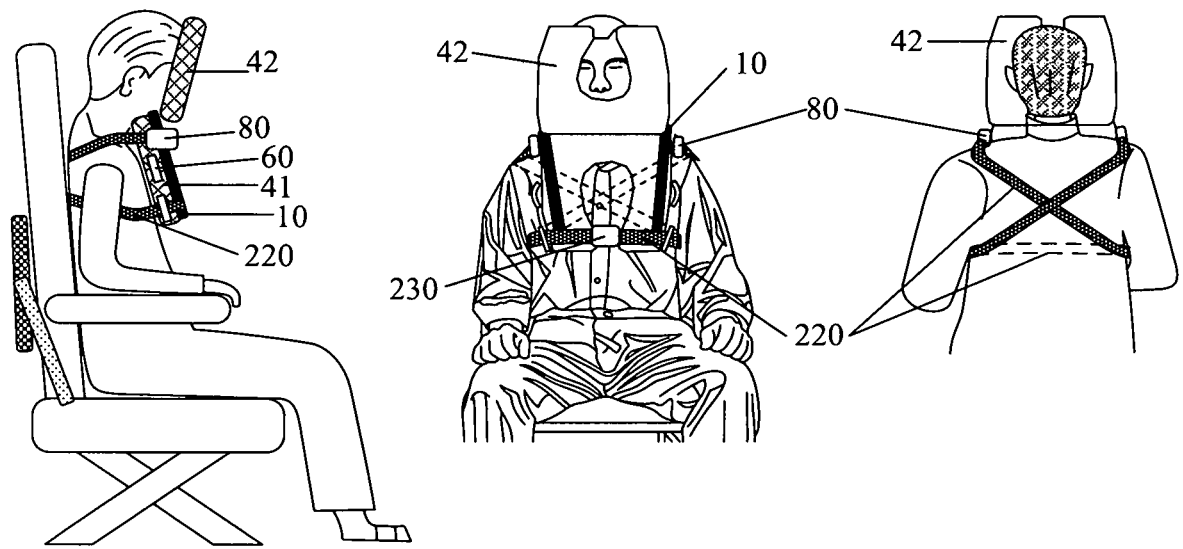
Figure 26D:
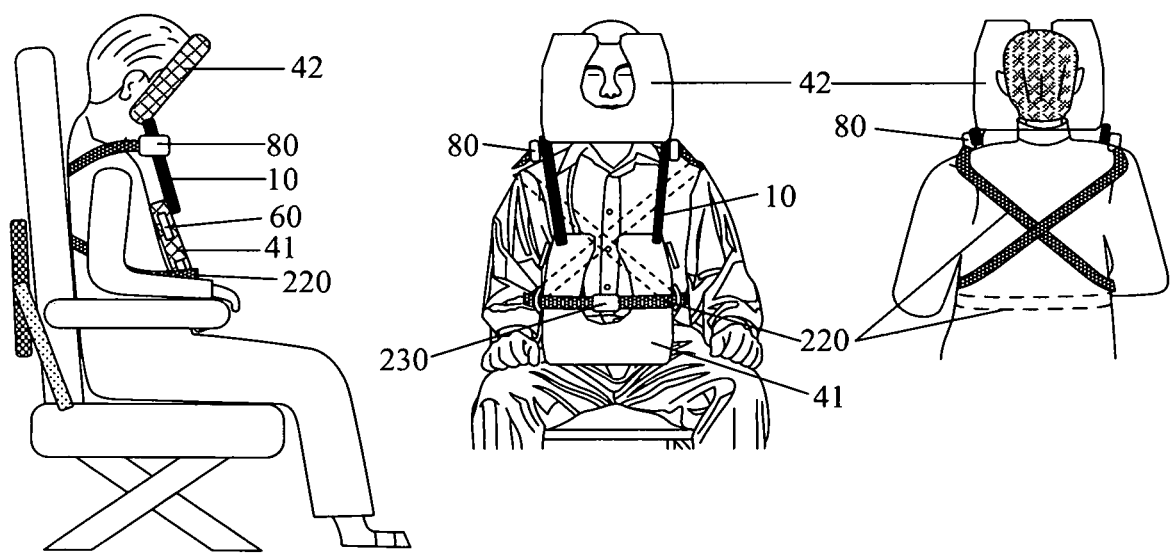

The second mode: a prone pillow. As shown in FIG. 25a and FIG. 25b, according to the actual use situation, the travel pillow 100 is adjusted to have a z-shape of a suitable height or a U-shape that is tilted and collapsed, and placed on a small table. The traveler can pick up the support surface of the first pillow body 41 or the second pillow body 42 of the travel pillow 100 and use it as a prone pillow. When sitting in a seat while be traveling, if you want to take a break, but you will feel bad, you can use the prone pillow to eliminate the discomfort when sleeping directly caused by various reasons.

The third mode: a vertical pillow. As shown in FIGS. 26a to 26d, the travel pillow 100 is adjusted to a suitable two-piece or three-piece mode, and the travel pillow 100 is secured to the traveler's chest using the fastening means 200, and the belt 220 is adjusted by adjusting the first buckle 230. By adjusting the first buckle 230 to adjust the belt 220 to a suitable length, the travel pillow 100 can be used as a vertical pillow while sitting. In this mode of use, the fastening means 200 passes through the belt loop 60 on the travel pillow 100, and then engages with the buckle socket 80 of the travel pillow 100 after the traveler's back is crossed, because the fastening means 200 is on the back of the traveler. Without going through the neck, it does not put pressure on the traveler's neck, making the neck tired and sore.

In addition, the fastening means 200 is capable of being used to carry the travel pillow 100 to the handle or the box of the trolley case for carrying, which does not occupy the space of the trolley case, and does not occupy both hands, and the portability is greatly improved.

Although various embodiments of the present invention are described above, these embodiments neither present all details, nor imply that the present invention is limited to these embodiments. Obviously, many modifications and changes may be made in light of the teaching of the above embodiments. These embodiments are presented and some details are described herein only for explaining the principle of the invention and its actual use, so that one skilled person can practice the present invention and introduce some modifications in light of the invention. The invention is intended to cover alternatives, modifications and equivalents that may be included within the spirit and scope of the invention as defined by the appended claims.

What is claimed is:

1. A travel pillow, comprising:
at least one connecting rod having a first end and a second end; a fastening means; and
a first pillow body having a first frame and a first soft cushion mounted on the first frame and a second pillow body having a second frame and a second soft cushion mounted on the second frame, with one end of each of said frames being coupled to a respective one of said first end and said second end of said connecting rod, wherein said first pillow body is configured to be rotated at said first end of said connecting rod and locked at a first predetermined angle relative to a length of said connecting rod, and said second pillow body is configured to be rotated at said second end of said connecting rod and locked at a second predetermined angle relative to the length of said connecting rod;
wherein, in a folded state, the first soft cushion and the second soft cushion sandwich the connecting rod and form a backrest cushion with oppositely facing outer cushioning surfaces, and in an unfolded state, one or both of the soft cushions is swung away from the connecting rod, the first soft cushion is adapted to contact a head of the user, the second soft cushion is adapted to contact a chest or an abdomen of the user, and the second soft cushion is adapted to be fixed to a back of the torso of the user by the fastening means to support the head of the user relative to the torso of the user.

2. The travel pillow according to claim 1, wherein each of said soft cushions is one selected from a group consisting of an airbag cushion, a cotton cushion, a sponge cushion, a memory foam cushion, and their combinations.

3. The travel pillow according to claim 1, wherein at least one of said soft cushions has a support surface having an inclined surface relative to the frame on which the soft cushion is mounted.

4. The travel pillow according to claim 1, wherein at least one of said soft cushions has an opening for accommodating a user's face or supporting a user's neck.

5. The travel pillow according to claim 1, further comprising a first locking member and a second locking member, wherein said first end and said second end of said connecting rod comprise a first shaft and a first shaft hole, respectively, said frame of said first pillow body comprises a second shaft hole through which said first shaft passes, said frame of said second pillow body comprises a second shaft which passes through said first shaft hole, and said first locking member and said second locking member engage with said first shaft and said second shaft, respectively.

6. The travel pillow according to claim 5, wherein each of said first locking member and said second locking member is a nut that allows said frames to rotate relative to said connecting rod in a released state, and locks an angular position of said frames relative to said connection rod in a fastened state.

7. The travel pillow according to claim 1, further comprising a first locking member and a second locking member, wherein said first end and said second end of said connecting rod comprise a first shaft hole and a second shaft hole, respectively, said frame of said first pillow body comprises a third shaft hole, said frame of said second pillow body comprises a fourth shaft hole, said first locking member comprises a first shaft that passes through said first shaft hole and said third shaft hole, and said second locking member comprises a second shaft that passes through said second shaft hole and said fourth shaft hole.

8. The travel pillow according to claim 7, wherein each of said first locking member and said second locking member comprises a screw and a nut that allows said frames to rotate relative to said connecting rod in a released state, and locks an angular position of said frames relative to said connection rod in a fastened state.

9. The travel pillow according to claim 6 or 8, wherein each of said first locking member and said second locking member further comprises a flexible arm having a length larger than a diameter of the shaft holes, to prevent said locking member from falling out of said shaft holes in the released state.

10. The travel pillow according to claim 6 or 8, wherein each of said first end and said second end of said connecting rod comprises a first surface with teeth protruding along an axial direction of a shaft, and an end of said frame comprises a second surface with teeth protruding along said axial direction of said shaft, and said first surface is separated from said second surface in a released state, and said first surface is engaged with said second surface in a fastened state.

11. The travel pillow according to claim 8, wherein said one end of said frame of each of said first pillow body and said second pillow body comprises a branch portion, said first end and said second end of said connecting rod are clamped in said branch portion.

12. The travel pillow according to claim 11, wherein each of said first end and said second end of said connecting rod comprises a first surface with teeth protruding along an axial direction of a shaft, said branch portion has a second surface which faces said first surface and is provided with teeth protruding along said axial direction of said shaft, and said first surface is separated from said second surface in a released state, and said first surface is engaged with said second surface in a fastened state.

13. The travel pillow according to claim 1, wherein at least one of said first pillow body and said second pillow body is swung away from said connecting rod in said unfolded state and both of said first pillow body and said second pillow body are proximate to said connecting rod in said folded state.

14. The travel pillow according to claim 13, wherein said travel pillow provides a two-piece mode and a three-piece mode in said unfolded state,
in said two-piece mode, one of said first pillow body and said second pillow body is separated from said connecting rod, and the other of said first pillow body and said second pillow body is proximate to said connecting rod,
in said three-piece mode, both of said first pillow body and said second pillow body are separated from said connecting rod.

15. The travel pillow according to claim 14, wherein in said unfolded state, one of said first pillow body and said second pillow body is adapted to contact an outer surface of a body member of the user or an outer surface of another object.

16. The travel pillow according to claim 15, wherein said outer surface is a surface of the other object.

17. The travel pillow according to claim 16, further comprising a plurality of pads at said one end of said frame of said first pillow body and at said one end of said frame of said second pillow body, wherein said plurality of pads are adapted to contact said outer surface.

18. The travel pillow according to claim 16, wherein said outer surface is a surface of a human chest or a human abdomen, and said travel pillow is adapted to be secured on the human body of the user.

19. The travel pillow according to claim 1, wherein said fastening means is for fixing said travel pillow to the user body.

20. The travel pillow according to claim 1, wherein said fastening means comprises:
a first belt and a second belt; and
a first buckle between one end of said first belt and one end of said second belt and is configured to adjust a length of at least one of said first belt and said second belt.

21. A travel pillow according to claim 20, further comprising:
a second buckle between the other end of said first belt and said connecting rod; and
a third buckle between the other end of said second belt and said connecting rod.

22. A travel pillow according to claim 20, further comprising:
a second buckle between the other end of said first belt and one of said frames; and
a third buckle between the other end of said second belt and one of said frames.

23. The travel pillow according to claim 20, further comprising a plurality of belt loops, wherein said plurality of belt loops are located on a side surface of one of said soft cushions.

24. The travel pillow according to claim 23, wherein said first belt and said second belt pass through said plurality of belt loops.

* * * * *